United States Patent
Kremser et al.

(10) Patent No.: US 6,473,839 B1
(45) Date of Patent: Oct. 29, 2002

(54) DEVICE FOR EXCHANGING DATA AND PROCESS FOR OPERATING IT

(75) Inventors: Rolf Kremser, Neuried; Bernd Diebold, Rheinau, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/649,720

(22) PCT Filed: Nov. 9, 1994

(86) PCT No.: PCT/DE94/01323

§ 371 (c)(1),
(2), (4) Date: May 22, 1996

(87) PCT Pub. No.: WO95/15043

PCT Pub. Date: Jun. 1, 1995

(30) Foreign Application Priority Data

Nov. 24, 1993 (DE) .......................................... 43 40 048

(51) Int. Cl.[7] .............................................. G06F 12/00
(52) U.S. Cl. ........................ 711/154; 711/156; 711/163; 709/211
(58) Field of Search ....................... 395/200.05, 200.17, 395/652, 185.05, 200.38; 340/825.5; 370/407, 452; 364/424.04

(56) References Cited

U.S. PATENT DOCUMENTS

| | | | | |
|---|---|---|---|---|
| 4,368,514 A | * | 1/1983 | Persaud et al. | ......... 395/200.05 |
| 4,546,351 A | * | 10/1985 | Nambu | ..................... 340/825.5 |
| 4,750,136 A | | 6/1988 | Arpin et al. | |
| 4,942,571 A | * | 7/1990 | Moller et al. | ................ 370/407 |
| 5,031,095 A | * | 7/1991 | Hara et al. | .............. 395/200.17 |
| 5,345,384 A | * | 9/1994 | Przybyla et al. | ....... 364/424.04 |
| 5,349,673 A | * | 9/1994 | Yasuda | ........................ 395/652 |
| 5,361,260 A | * | 11/1994 | Mito | ........................... 370/452 |
| 5,621,888 A | * | 4/1997 | Botzenhardt et al. | .. 395/185.05 |

FOREIGN PATENT DOCUMENTS

DE 3928831 3/1991

OTHER PUBLICATIONS

ISO 9141, 1989; Road vehicles—Diagnostic systems –Requirements for interchange of digital information. pp. iii, iv, 1–11.

* cited by examiner

Primary Examiner—David Hudspeth
Assistant Examiner—Fred F. Tzeng
(74) Attorney, Agent, or Firm—Venable; Norman N. Kunitz

(57) ABSTRACT

A device or arrangement for exchanging data between a main station (master) (10) and at least one secondary station (slave) (12, 12n), which each have access to at least one common data line (11) via interfaces CAN, and processes for operating the device. Except for an individual identifier (a, b, . . . , d) of each slave (12, 12n), which is stored in an identifier memory (27, 27n) disposed in the slave (12, 12n), the slaves (12, 12n) are identical. The master (10) likewise includes an identifier memory (22), in which the identifiers (a, b, . . . , d) of the slaves (12, 12n) are to be stored, so that the master can address the slaves (12, 12n) in a targeted way and can process the data output by the slaves (12, 12n). The processes according to the invention pertain to the storage of the identifiers (a, b, . . . , d) in the identifier memory (22) of the master (10) and to the procedure in the event of ai failure of slaves (12, 12n) and/or of the master (10), taking into account the case where no external computer (14) that could furnish all the required information is available. The device according to the invention and the processes according to the invention are especially suitable for use in a multiplexing system that is preferably disposed in a motor vehicle.

10 Claims, 4 Drawing Sheets

DEVICE FOR EXCHANGING DATA AND PROCESS FOR OPERATING IT

PRIOR ART

The invention is based on a device arrangement for exchanging data and on a process for operating such a device which generally includes a main station (master) and at least one secondary station (slave), which each have access via respective interfaces to at least one common data line. From European Patent Application EP-A 0 396 090, a generic device for exchanging data between a main station, called a master, and at least one secondary station, called a slave, is known. Both the master and the slaves have interfaces, which each access at least one common data line. The master can address all the slaves. A data transmission from a slave to the master that may possibly be necessary can be started by the slave itself without being ordered to do so by the master. The essential signal processing is located in the master, while the slaves for instance prepare the signals, output by sensors and supplied to the slaves, for data transmission to the master and optionally carry the signals output by the master for actuating final control elements. These provisions contribute to keeping the expense for circuitry in the slaves as low as possible, to enable inexpensive manufacture. The known device is contemplated in the context of a multiplexing system that is disposed in a motor vehicle. By way of example, the slaves are actuators for devices relating to passenger comfort, control units and other electrical motor vehicle components that are controlled from a central point by at least one master. The various slaves are embodied differently, so that they can meet the signal detection and signal output functions assigned to them.

The object of the invention is to provide a device for exchanging data that can be made economically.

SUMMARY AND ADVANTAGES OF THE INVENTION

The above objects generally are achieved according to the present invention by a device or arrangement for exchanging data between a main station (master) and a plurality of secondary stations (slave), which each have access via respective interfaces to at least one common data line, wherein: the master contains an identifier memory for receiving identifiers of the slaves; the slaves are all substantially identical and each contains one identifier memory in which an individual identifier, which is unique to the associated slave and which is to be stored in the identifier memory of the master, is stored; and the slaves each include one program memory for holding applications-specific programs intended for the respective slave.

The device of the invention for exchanging data has the advantage that all the secondary stations, hereinafter called slaves, are embodied identically, at least in a basic configuration. The various slaves differ only in an individual, one-time identifier, which is stored in the slave in the form of a sequential serial number, for instance during manufacture. The functions to be performed by the slaves are not assigned to the slaves until after the device is put into operation. The function of the slaves is defined by programs, which are stored in a memory for applications specific programs that is located in the slave. The main station, hereinafter called the master, contains an identifier memory for holding the identifiers stored in memory in the slaves, to enable identifying the slaves.

A preferred application of the device of the invention is disclosed in the context of a multiplexing system disposed for instance in a motor vehicle. One substantial advantage is the economical embodiment of the device of the invention, because a greater number of identical slaves can be manufactured. A further advantage arises in stocking of spare parts, which in the simplest case means uniformly embodied masters and the identical slaves.

Advantageous further features and embodiments of the device of the invention will become apparent from dependent device claims.

An especially advantageous provision is to equip the master with a memory for holding the applications-specific programs to be stored in the slaves. If a replacement of a slave should become necessary in the course of a repair, access to the applications-specific program contained in the master can be gained at any time, and it can be loaded in the new slave.

It is especially advantageous for each of the individual slaves to be assigned applications interfaces whose function is defined in accordance with the applications-specific programs to be stored in the applicable slave. With this provision, it is possible to adapt the number of both inputs and outputs to given requirements.

An advantageous embodiment provides that the identifier, stored in invariable form in the various slaves and contained for instance in a random access memory, is a sequential serial number assigned in production. This provision assures that if replacement of a slave should become necessary in a repair, the slaves will always have different identifiers.

An advantageous further feature provides that the master includes an interface that makes it possible for the applications-specific programs to be stored in the various slaves to be loaded from an external computer via the master into the slaves and into the memory that is possibly present in the master. With this interface it is possible in particular to transmit the identifiers of the various slaves to the master.

The interface, by way of example, is a diagnostic interface in accordance with DIN/ISO 9141. Embodying the interface as a standardized diagnostic interface enables self-diagnosis in the known device. The memory required for the diagnostic data need be present only in the master. The diagnostic data ascertained in the various slaves are transmitted to the master via the common data line, and in the master are either stored directly in the diagnosis memory or first are further processed in the context of diagnostic programs. The entire system of master and slaves thus contains only a single diagnostic interface.

The processes of the invention each enable advantageous operation of the device of the invention.

In a first process of the invention, it is provided that the identifiers of the slaves are imparted to the master via the diagnostic interface disposed in the master. This provision thus directly makes the identification process itself possible. The external computer also furnishes the applications-specific programs intended for the slaves.

In another process it is provided that the master procures the identifiers stored in the various slaves on its own, by readout of the identifiers stored in the slaves. The requisite for this process is that the slaves upon installation of the device of the invention are connected to the common data line in a specified order and are put into operation one after the other in that order. With this process, the replacement of a defective master when the slaves are intact or the replacement of at maximum all the slaves is possible.

Another process according to the invention for operating the device is directed to repair, in which a slave is replaced.

From a comparison of the identifiers stored in the master with the identifiers of the slaves present before, the new slave can be ascertained, and the old identifier in the master replaced with the new identifier of the new slave.

Further advantageous features and embodiments of both the device of the invention and the processes of the invention will become apparent from the further dependent claims and in conjunction with the ensuing description.

DETAILED DESCRIPTION OF THE PREFERRED EMBODIMENT

Figure 1:
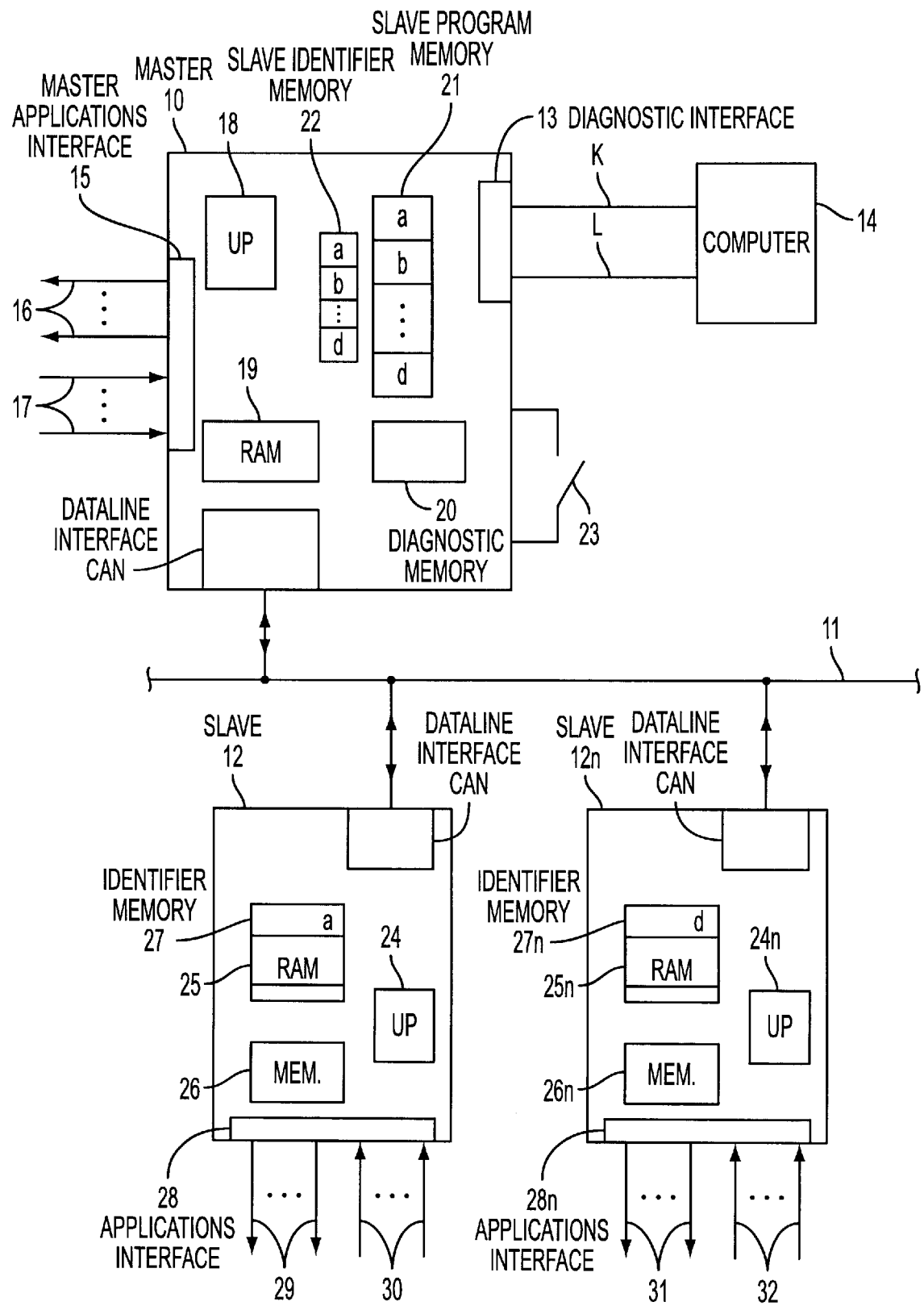
FIG. 1 shows a device according to the invention for exchanging data between a main station (master) and at least one secondary station (slave)

FIG. 1 shows a main station 10, hereinafter called a master, which is connected via an interface CAN with a data line 11, to which at least one secondary station 12a, 12b, hereinafter called the slave, is connected. The connection of the slaves 12a, 12b to the data line 11 is effected via interfaces CAN, which are equivalent to the interface CAN provided in the master 10. The master 10 includes two further interfaces. A first interface is a diagnostic interface 13, which can be connected to an external computer 14 via two lines, marked K and L. A further interface contained in the master 10 is the master-applications interface 15, which has a definable number of outputs 16 and inputs 17.

The control of the signal courses in the master 10 is performed by a microprocessor 18, which cooperates with a random access memory 19, a diagnostic memory 20, a memory 21 for slave programs, and an identifier memory 22. Both the memory 21 for slave programs and the identifier memory 22 are divided into an equal number of memory spaces that correspond to one another. The correspondence is indicated by connecting lines. Each of the memory spaces are marked a, b, . . . , d. The number is fixed at n, which is equivalent to the maximum number of slaves 12, 12n that can be connected. For the sake of simplicity, the connecting lines in the master 10 that are present between the various components are not shown.

The master 10 is assigned a switch 23, for instance an already existing switch in a dashboard, which is provided for the starting of events that proceed within processes of the invention for operating the device, which processes will be described in detail hereinafter. The slaves 12, 12n are embodied identically. The number of slaves 12, 12n that can be connected to the data line 11 is limited to the number n. The slaves 12, 12n each include one microprocessor 24, 24n, which cooperates with a random access memory 25, 25n, a memory 26, 26n, and an identifier memory 27, 27n contained in the slave 12, 12n. An individual identifier for each slave 12, 12n is stored in the identifier memories 27, 27n, respectively, and is shown in the exemplary embodiment illustrated as a, b, . . . , d. The various slaves 12, 12n differ from one another only in this identifier a, b, . . . , d. In addition to the interface CAN, each slave 12, 12n includes a slave-applications interface 28, 28n, whose function, however, can be programmed differently from slave to slave, 12, 12n. The slave-applications interface 28 in the slave 12 includes a predeterminable number of outputs 29 and a predeterminable number of inputs 30. The slave-applications interface 28n in the slave 12n includes a likewise predeterminable number of outputs 30 and a predeterminable number of inputs 32.

The device of the invention functions as follows:

The master 10 and the at least one slave 12, 12n, which can each exchange data over the same interfaces CAN and over the common data line 11, are located for instance in a motor vehicle in the framework of a multiplexing system. Both the master 10 and the slaves 12, 12n cooperate with control units, actuators or sensors. Certain actuators and sensors can be combined into a function unit to which a respective slave 12, 12n is assigned. Such a functional unit is, for example, an adjuster relating to passenger comfort, disposed in a motor vehicle door or seat. Examples of actuators provided in such adjusters are electric motors, valves, lamps and the like, while rpm sensors or position sensors are present as the sensors. Actuators may be connected directly to the outputs 16 of the master 10, the outputs 29 of the slave 12, or the outputs 31 of the slave 12n, optionally with the interposition of an end stage. The sensors may be connected directly to the inputs 17 of the master 10, the inputs 30 of the slave 12, or the inputs 32 of the slave 12n. In the other embodiment already mentioned, the master 10 or one of the slaves 12, 12n can cooperate with a control unit; the required data exchange likewise takes place via the applications interfaces 15, 28, 28n. The terms "master" and "slave" do not have the meaning that only the master 10 can start a data transmission or purposefully call up a slave 12, 12n. On the contrary, multimaster operation is possible, in which all the participants 10, 12, 12n connected to the common data line 11 can start a data transmission directed to an arbitrary other participant 10, 12, 12n. Collisions can be averted with a list of priorities.

One substantial advantage of the device of the invention is that the slaves 12, 12n, at least in the basic configuration, are embodied identically. This provision favors economical mass production and simple stockkeeping. The various slaves 12, 12n differ solely in the identifier 27, 27n, which by way of example is an individual, unique, sequential serial number that can be programmed into the respective identifier memories 27, 27n of the slaves 12, 12n in a concluding function check at the end of the production line. The identifier memory 27, 27n can be considered part of the random access memory 25, 25n contained in the slave 12, 12n; this memory likewise contains data that are stored in production, and the data contained in the random access memory 25, 25n are identical for each slave 12, 12n. The data stored in the random access memory 25, 25n may be assigned to different programs. For instance, one program supports the work of the interface CAN, while the other program carries out diagnosis of the outputs 29, 31 and the inputs 30, 32, for instance. The diagnosis detects short circuits, interruptions and overloads, for instance, and can optionally carry out plausibility observations, which are required to detect errors that do not amount to a total failure. The diagnosis is especially valuable for detecting sporadic errors. The data ascertained by the diagnostic program are stored in the memory 26, 26n. The memory 26, 26n is a memory type (EEPROM) that is electrically writable and preferably is also electrically eraseable.

The essential task of the memories 26, 26n contained in the slaves 12, 12n is the storage of applications-specific programs. An applications-specific program for instance defines the number of outputs 29, 31 and the number of inputs 30, 32. It is also possible to define whether the outputs 29, 31 and the inputs 30, 31 function digitally or in analog fashion. Moreover, one applications-specific program each should be stored that is capable of controlling the function unit connected to the respective slave 12, 12n and can optionally further process reports back from it.

The applications-specific programs initially not contained in the slaves 12, 12n, which are to be stored in the memory 26, 26n, are loaded from the master into the memories 26, 26n of the slaves 12, 12n via the data line 11 when the applicable slave 12, 12n is put into operation. For carrying out this task, it is essential that the master 10 know the identifier a, b, ..., d of the various slaves 12, 12n connected to the data line 11, so that an unambiguous assignment of the programs for the slaves 12, 12n is possible. The identifier a, b, ..., d of the slaves 12, 12n is stored in the identifier memory 22 of the master 10. The various identifiers a, b, ..., d can be imparted to the master 10 either by the slaves 12, 12n themselves or by the external computer 14. The external computer 12, 14 communicates with the master 10 via the diagnostic lines K, L connected to the diagnostic interface 13.

The designations K, L establish a connection in conformity with the DIN/ISO Standard 9141, to which reference is hereby expressly made. Although DIN/ISO 9141 is directed to the diagnosis of electronic systems disposed in the motor vehicle, a more-extensive data transmission, for instance including the storage of the individual identifiers a, b, ..., d in the identifier memory 22 may readily be contemplated as well. According to DIN/ISO 9141, at least one line K is required. The external computer 14 contains the diagnostic test unit, named in DIN/ISO 9141, which performs the diagnosis. The diagnostic data, which are either ascertained by the master 10 itself or transmitted to the master 10 by the individual slaves 12, 12n, are stored in the diagnosis memory 20. The master 10 can process the diagnostic data output by the individual slaves 12, 12n and, for instance by comparison of the diagnostic data output by various slaves 12, 12n, can detect errors that have not been detected in the individual slaves 12, 12n. The diagnostic data stored in the diagnosis memory 20 can be interrogated and/or cancelled by the external computer 14 in accordance with DIN/ISO 9141. The diagnosis memory 20 in the master 10 is preferably also equivalent to a memory type (EEPROM) that is electrically writable and eraseable. Instead of the external computer 14, naturally any other suitable diagnosis unit can also be used.

The diagnosis memory 20 in the master 10 may optionally have a memory region that receives applications-specific programs that the master 10 requires, if there is a master-applications interface 15. The master-applications interface 15 makes it possible for the master 10, in addition to its other tasks, to take on a function that is also perceived by the slaves 12, 12n. The applications-specific programs optionally stored in the diagnosis memory 20 therefore define both the number of outputs 16 and inputs 17 and their function, for instance whether they are digital or analog.

The programs determined for the various slaves 12, 12n and to be stored in the memories 26, 26n of the slaves 12, 12n may in one embodiment be transmitted from the external computer 14 into the master 10 and carried onward by the master 10. In an especially advantageous further feature of the device according to the invention, it is contemplated that the memory 21 for slave programs, in which the programs to be stored in the various slaves 12, 12a are also stored, is provided in the master 10. With this provision it is possible, if the device of the invention fails, for instance in the event of a defect of one or more slaves 12, 12n or a failure of the master l0, to perform a repair even without an external computer 14. Without the external computer 14, initialization can be started with the switch 23.

Figure 2:
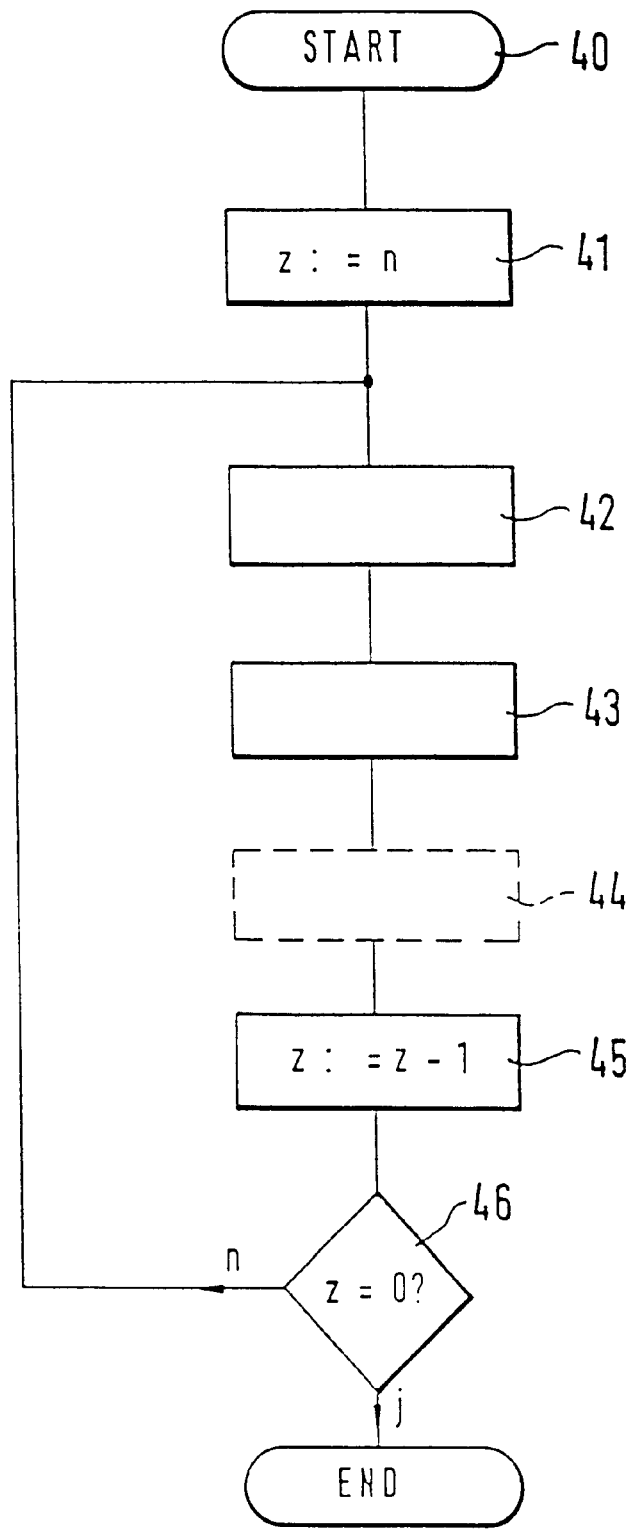
FIGS. 2–4 show flow charts of processes for operating a device of the invention.
Figure 3:
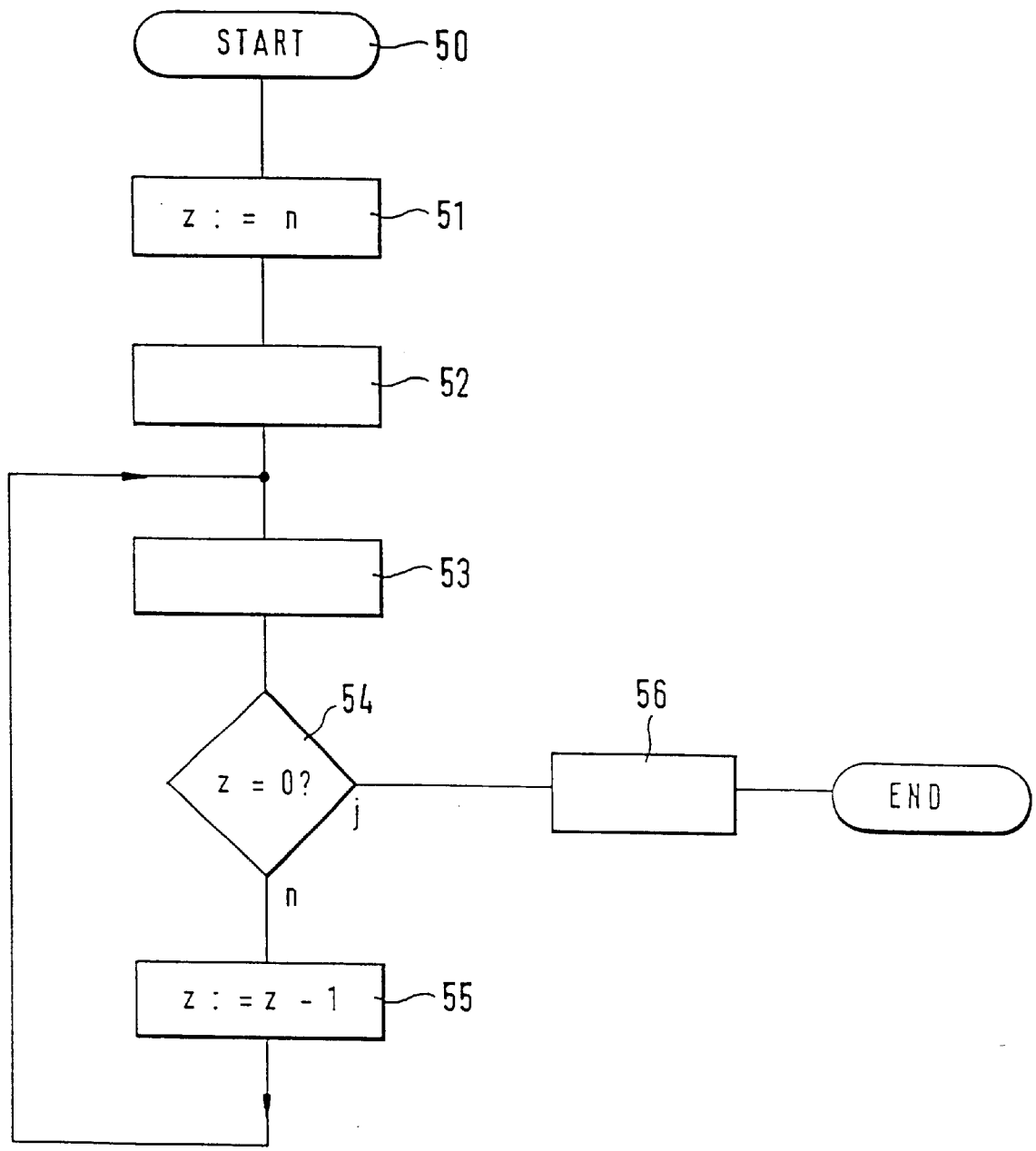
Figure 4:
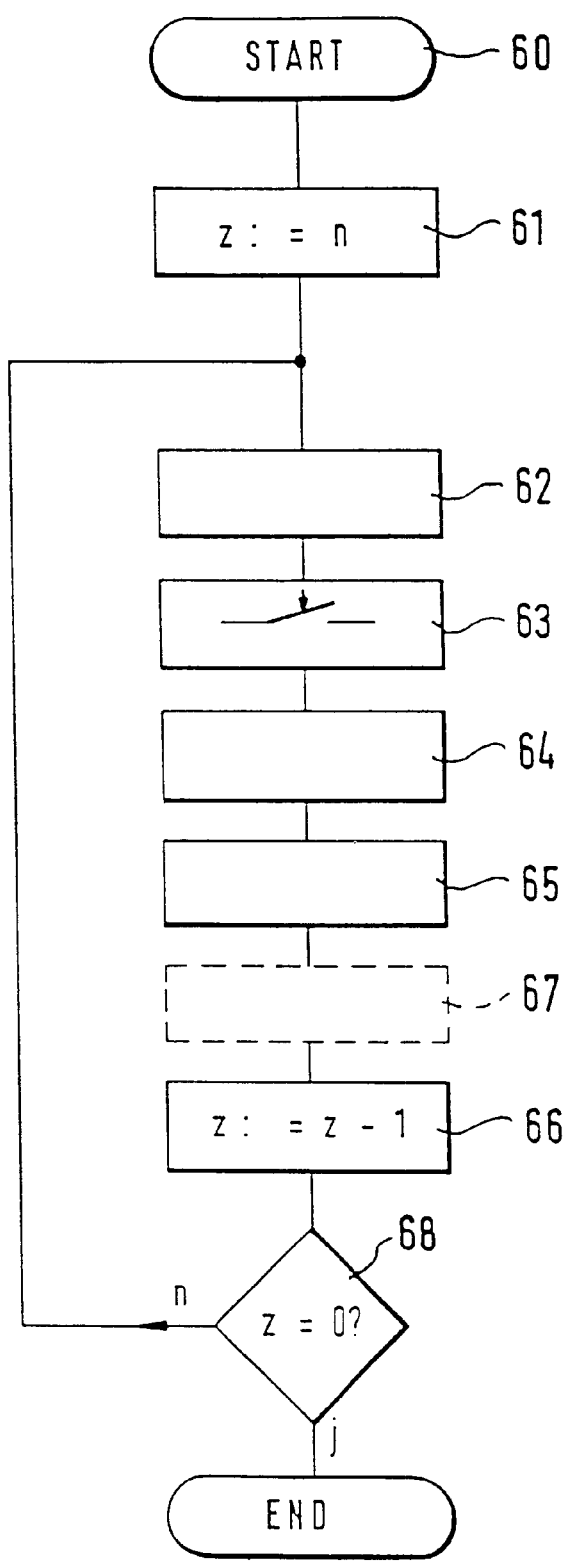

The various processes for operating the device of the invention will be described in further detail below in conjunction with the flowcharts shown in FIGS. 2–4:

FIG. 2 shows a flowchart that corresponds to a process by which the device of the invention can be put into operation, in which the identifiers a, b, ..., d of the slaves 12, 12n to be stored in the master 10 and the applications-specific programs each to be stored in the slaves 12, 12n are furnished by the external computer 14 in the memory 26, 26n. The identifiers a; b, ..., d of the various slaves 12, 12n are known to the external computer 14. This information can be input manually, for instance, by reading out the identifiers a, b, ..., d, which by way of example are either printed directly on the individual slaves 12, 12n or are printed on a package of slaves 12, 12n.

After a start 40 tripped by the external computer 14, in an assignment step 41 a counting variable z is set equal to the number n of slaves 12, 12n. In an ensuing memory step 42, the identifier a of the first slave 12 is stored in the identifier memory 22 in the master 10. In the next memory step 43, the program furnished by the external computer 14 is loaded via the master 10, the interfaces CAN and the common data line 11 into the memory 26, 26n of whichever slave 12, 12n has an address or part thereof that corresponds to the identifier a, b, ..., d. The prerequisite is that the association of the various applications-specific programs with the identifiers a, b, ..., d be known to the external computer 14. Since the individual applications-specific programs are defined, care must merely be taken that the applicable slave 12, 12n is brought to the specified place where the applicable applications-specific program is to run. In the next memory step 44, it is provided that the applications-specific program stored in the respective slave 12, 12n is also memorized in the memory 21 for slave programs, if the memory 21 is provided in the master 10. This is why the memory step 44 is shown in dashed lines in FIG. 2. In an ensuing assignment step 45, the value of the counting variable z is reduced by one. The ensuing interrogation step 46 finds out whether all the slaves 12, 12n have been accounted for. If not, a return to memory step 42 is made. If so, the initialization is at an end. After the end of the initialization, normal operation begins.

If one slave 12, 12n fails, the affected slave 12, 12n is replaced. If the external computer 14 is available, then the master 10 need merely be told the new identifier a, b, ..., d of the new slave 12, 12n and storage of the applications-specific programs in the affected memory 26, 26n brought about. If the external computer 14 is not available, then if one slave 12, 12n fails the process according to the invention as shown in FIG. 3 is provided; the prerequisite is that the memory 21 for slave programs be present in the master 10, and that the individual slaves 12, 12n are capable of transmitting their identifier a, b, ..., d to the master 10; the various identifiers a, b, ..., d of the slaves 12, 12n must be known in the master 10. Accordingly, a general addressing of the slaves 12, 12n, in which all the slaves 12, 12n consider themselves to have been addressed, without sending the identifier a, b, ..., d as part of the address, must be possible.

After a start 50, which can be tripped with the switch 23, for instance, in the assignment step 51 the counting variable z is assigned a value that is equivalent to the number n of slaves 12, 12n. In an ensuing general transmission request 52, the master 10 elicits a response from each slave 12, 12n. In a read-in operation 53, the applicable identifier a, b, ..., d of a slave 12, 12n that has just now responded is read into the master 10 and optionally compared immediately with the identifiers a, b, ..., d of the slaves 12, 12n stored in the identifier memory 22 of the master 10. In the ensuing interrogation step 54, it is ascertained whether all the slaves 12, 12n have already answered. If not, then in an assignment step 55 the counting variable is reduced by one and a return to the read-in operation 53 is made. The functionally capable slaves 12, 12n are configured and respond with a special message, which preferably directly contains the identifier a, b, ..., d of the applicable slave 12, 12n. A message priority list for access to the bus, which list is stored in the slave 12, 12n, prevents a data collision on the data line 11. Only the one slave 12, 12n that has been replaced answers with a general message, which the master 10 can interpret accordingly. The replaced slave 12, 12n is thus identified. If it is found in the interrogation step 54 that all the slaves 12, 12n have been accounted for, then in the assignment step 56 an initialization of the new slave 12, 12n takes place, by transmission of the applications-specific program, provided for the applicable slave 12, 12n, that is stored at the appropriate point in the master 10 in the memory 21 for slave programs. Simultaneously, in the master 10, the identifier a, b, ..., d of the new slave 12, 12n that has been read in is transmitted to the identifier memory 22 at the appropriate point, and the former identifier a, b, ..., d of the already replaced defective slave 12, 12n first having been deleted.

A further process according to the invention pertains to the procedure in the event of failure of the master 10. With the prerequisite that all the slaves 12, 12n are functioning properly and therefore know the particular applications-specific program assigned to them, the memory 21 for slave programs is not necessary in the master 10. If this memory 21 for slave programs is present and contains the corresponding applications-specific programs provided for the various slaves 12, 12n, then not only the master 10 but in addition an arbitrary number of defective slaves 12, 12n can be replaced. The process of the invention will be described in further detail in conjunction with the flowchart of FIG. 4. After a start 60, which ensues for instance by turning on the energy supply of the replaced master 10 or for instance after an already-tripped test course, first in an assignment step 61 a counting variable z is assigned the value n, which is equivalent to the number of slaves 12, 12n, which number must be known to the master 10. The number n is equivalent to the memory spaces for the various identifiers a, b, ..., d in the identifier memory 22. For the ensuing process the prerequisite must be that the slaves 12, 12n be connected successively to the common data line 11 in a specified order. If a plurality of defective slaves 12, 12n are to be replaced, then in this case as well a specified order of connection must be adhered to. The order expediently corresponds to the numbering of the slaves 12, 12n, which is equivalent to the current status of the counting variable z. In the next step 62, a slave 12, 12n is to be connected to the common data line 11, and the order must be adhered to. After the affected slave 12, 12n is connected, the master 10 must be informed that the connection operation has been completed. This is done in the program step 63 for instance by an actuation of the switch 23. The switch actuation causes the master 10 to transmit a general interrogation 64, which causes the newly connected slave 12, 12n to output its identifier a, b, ..., d stored in the identifier memory 27, 27n. The further course of the process depends on whether the memory 21 for slave programs is present in the master 10, and whether the applications-specific programs for the various slaves 12, 12n are stored in it. If this memory for slave programs 21 is not present, then defective slaves 12, 12n cannot be replaced. The course of the process proceeds directly to the assignment step 66, which performs a reduction of the counting variable z by one. Conversely, if the memory 21 for slave programs is present in the master 10, then after the output of the identifier a, b, ..., d, two options are possible in the ensuing step 67. If the memory 21 for slave programs is present but contains no applications-specific programs, then the applications-specific program must be present in each slave 12, 12n. In step 67, a transmission of the applications-specific program contained in the applications-specific memory 26, 26n to the master 10 is performed, and this program is placed there at a memory space of the memory 21 for slave programs that is equivalent to the sequentially counting variable z and to which the applicable identifier.a, b, ..., d is assigned. With this provision it becomes possible to handle a failure of a slave 12, 12n occurring at some later time by simply replacing the affected slave 12, 12n; the applications-specific programs to be stored in the affected slave 12, 12n can be called up by the master 10. If the memory for slave programs 21 is present in the master 10 and contains the various applications-specific programs, then in step 67 the appropriate applications-specific program can be made available the last slave 12, 12n to be connected to the common data line 11. With this provision, a replacement of the affected slave 12, 12n is possible. After the assignment step 66, it is found out that in the interrogation step 68 whether all the slaves 12, 12n have been accounted for. If not, then the next slave 12, 12n is connected to the common data line 11 in step 62, and the general interrogation 64 is begun with step 63. Conversely, if in the interrogation step 68 it is found that all the slaves 12, 12n have been accounted for, then the initialization is complete.

What is claimed is:

1. An arrangement for exchanging data between a main station (master) and a plurality of secondary stations (slave), which each have access via respective interfaces to at least one common data line, wherein the master contains an identifier memory for receiving and storing identifiers of the respective slaves; the slaves are all substantially identical and each contains one identifier memory, in which an individual identifier, which is unique to the associated slave and which is to be stored in the identifier memory of the master, is stored; and the slaves each include one program memory for holding applications-specific programs intended for the respective slave.

2. The arrangement of claim 1, wherein the master, a memory is provided for holding the application-specific programs to be stored in the respective slaves.

3. The arrangement of claim 2, further comprising means for, following replacement of a slave with a new slave, causing a replacement of the identifier stored in the identifier memory of the master for the replaced slave, with a new identifier of the new slave, and for causing a transmission of the applications-specific programs, contained in the memory for slave programs in the master to the new slave and the storage of the application-specific programs in the program memory of the new slave.

4. The arrangement of claim 1, wherein the function of a slave-applications interface contained in a respective slave is defined by an applications-specific program stored n the program memory of the respective slave.

5. The arrangement of claim 1, wherein the individual identifier stored in the respective slaves is a sequential number (serial number) assigned during the manufacture of the slaves.

6. The arrangement of claim 1, wherein a diagnosis memory for storing diagnostic data of the slaves and/or diagnostic data of the master is provided in the master, which diagnostic memory can be read out and erased by an external computer via a diagnostic interface disposed in the master.

7. The arrangement of claim 1, wherein the applications-specific programs to be stored in the respective program memory of each of the slaves are furnished by an external computer, which can be connected to the master via a diagnostic interface contained in the master.

8. The arrangement of claim 6, wherein the external computer loads the identifiers of the slaves to be stored in the master into the identifier memory contained in the master, and the external computer loads the applications-specific programs, to be stored in the slaves in the respective program memory of each of the slaves via the master.

9. The arrangement of claim 1, wherein slaves interrogate the identifiers of the slaves that are to be stored in the identifier memory of the master, and the slaves are connected in succession to the common data line in a specified order.

10. The arrangement of claim 1, wherein the arrangement is part of a time-division multiplexing system, preferably disposed in a motor vehicle, whereby a data exchange between the master and the slaves or among the slaves takes place by time division multiplexing over the common data line.

* * * * *